Patented May 11, 1954

2,678,335

UNITED STATES PATENT OFFICE 2,678,335

PRODUCTION OF BIS-(DIMETHYLAMINO)-CHLOROPHOSPHINE OXIDE

Patrick Lester, Dorset, England, assignor to Pest Control Limited, Bourn, England, a British company No Drawing. Application March 3, 1953, Serial No. 340,167

Claims priority, application Great Britain March 4, 1952

3 Claims. (Cl. 260—543)

This invention relates to improvements in or relating to the manufacture of bis-(dimethylamino)-chlorophosphine oxide.

The compound bis-(dimethylamino)-chlorophosphine oxide is a diamide which is a useful intermediate in the manufacture of certain systemic insecticides because of the reactivity of the P-Cl link. The compound is usually prepared by the interaction, in a suitable solvent, of 1 mol. of phosphorus oxychloride with 2 mol. of dimethylamine according to the equation:

$$POCl_3 + 2Me_2NH \rightarrow (Me_2N)_2POCl + 2HCl$$

where Me represents the methyl group. In this reaction, an acceptor for the hydrochloric acid formed in the process has to be provided, and this can be done either by using a 100% excess of dimethylamine or by adding an equivalent amount of a suitable tertiary base.

This method yields a reaction mixture which contains, besides the desired diamide, varying amounts of the monoamide $(Me_2N)POCl_2$ as well as the hydrochloride of the base used as a hydrochloric acid acceptor, and the solvent. In order to obtain technically pure diamide, the mixture has to be taken through a number of purification steps which are costly and wasteful owing to the instability of the diamide.

The present invention provides a process whereby the desired diamide is produced, in good yield and sufficient purity for use as such in further syntheses, by causing 2 mol of tris-(dimethylamino)-phosphine oxide to react with 1 mol. of phosphorus oxychloride. The overall course of the reaction may be represented by the equation:

$$2(Me_2N)_3PO + POCl_3 \rightarrow 3(Me_2N)_2POCl$$

The reaction can be carried out within a wide range of temperatures without the addition of a solvent. For example, useful temperatures are between 100 and 200° C. For any given temperature, the reaction time should be adjusted so that the technically desired yield is obtained. For example, when the two compounds are reacted in substantially stoichiometric proportions, heating to 145° C. for 2 hours or heating to 170° C. for one hour gives a useful result.

The following table shows the percentage of triamide $(Me_2N)_3PO$ which remains unconverted after various intervals of time when the reactants are maintained at 150° C. in stoichiometric proportions:

| Time in minutes | Unconverted triamide percent |
|---|---|
| 10 | 71 |
| 40 | 35 |
| 55 | 21.5 |
| 70 | 10 |
| 100 | 6 |
| 120 | 5 |

It is desirable to employ the triamide in at least a slight excess of 2–5% over the theoretical amount. An excess of phosphorus oxychloride is undesirable because of the possible formation of the monoamide $Me_2N-POCl_2$ as a by product. On the other hand, a greater excess of the triamide is not objectionable, and may even be desirable because it speeds up the reaction, and makes sure that the final product is free from the monoamide, which may interfere seriously with further reactions. It is, in many cases, even useful to use the triamide in an excess of up to 100% over the theoretical amount, because that part of it which does not enter into reaction does not need to be removed but forms a solvent for the diamide, which is useful in the subsequent conversion of the diamide into other products, for example the corresponding fluoro compound.

The new method is much simpler than the older one described above, in that it requires no solvent and no base as an acceptor for liberated hydrochloric acid, and in that it leads to a very clean final product, making it unnecessary to isolate it from other products of the reaction.

The triamide which is the starting material for the reaction can be prepared by the usual method, i. e. by reacting 1 mol. of phosphorus-oxychloride with 3 mol. of dimethylamine in the presence of a solvent and a suitable base as acceptor for the hydrochloric acid. The preparation of this fully amidated compound is much easier than is the direct preparation of the diamide by the analogous reaction with 2 mol. of dimethylamine, because in the former case there is no danger of monoamide being formed. The final reaction mixture can be worked up without undue loss owing to the great stability of the triamide, which can be boiled with caustic soda without decomposition and can be stored indefinitely, even in the presence of moisture.

The following is an example of how the process of the invention can be carried out:

113 gm. of (Me₂N)₃PO (0.63 mols.) were heated to 100° C. and 47.5 gms. POCl₃ (0.31 mols.) added. The mixture was quickly heated to 150° C., and maintained at this temperature for two hours. Aliquots were removed at intervals, and the rate of disappearance of R₃PO was checked. The final product contained 88% by weight of bis-(dimethylamino)-chlorophosphine oxide (Bp. 118° C. at 16 mm.).

Whilst the equation given above represents the overall course of the reaction, as far as starting materials and end products are concerned, it is believed that the reaction does not entirely take place in this simple way. There are, in fact, indications of the formation of addition products in the first stages of the reaction, because on slow heating crystalline solids separate, which later go into solution.

What I claim is:

1. A process for the manufacture of bis-(dimethylamino)-chlorophosphine oxide which comprises reacting one molecular equivalent of phosphorus oxychloride with at least two molecular equivalents of tris-(dimethylamino)-phosphine oxide.

2. The process for the manufacture of bis-(dimethylamino)-chlorophosphine oxide which comprises heating one molecular equivalent of phosphorus oxychloride with at least two molecular equivalents of tris-(dimethylamino)-phosphine oxide to a temperature between 120 and 200° C.

3. The process for the manufacture of bis-(dimethylamino)-chlorophosphine oxide which comprises heating one molecular equivalent of phosphorus oxychloride with at least two molecular equivalents of tris-(dimethylamino)-phosphine oxide to about 150° C. for about two hours.

No references cited.